US005465382A

United States Patent [19]
Day, III et al.

[11] Patent Number: 5,465,382
[45] Date of Patent: Nov. 7, 1995

[54] SYSTEM AND METHOD FOR MAPPING DIRECTLY ACCESSIBLE MAGNETIC DASD STORAGE TO FIXED BLOCK OPTICAL STORAGE

[75] Inventors: Kennith F. Day, III; William D. Lamear, Jr.; Edward R. Morse, all of Tucson, Ariz.

[73] Assignee: International Business Machines Corporation, Armonk, N.Y.

[21] Appl. No.: 275,934

[22] Filed: Jul. 15, 1994

Related U.S. Application Data

[63] Continuation of Ser. No. 870,024, Apr. 17, 1992, abandoned.
[51] Int. Cl.$^6$ .................................................. G06F 12/02
[52] U.S. Cl. ..................... 395/404; 395/439; 395/412; 364/243; 364/255.1; 364/DIG. 1
[58] Field of Search ...................... 395/800, 425, 395/400, 575; 364/243, 255.1, DIG. 1

[56] References Cited

U.S. PATENT DOCUMENTS

| | | | |
|---|---|---|---|
| 3,082,406 | 3/1963 | Stevens | 340/172.5 |
| 4,494,156 | 1/1985 | Kadison et al. | 360/48 |
| 4,623,963 | 11/1986 | Phillips | 395/700 |
| 4,746,998 | 5/1988 | Robinson et al. | 360/72.1 |
| 4,833,663 | 5/1989 | Satoh et al. | 369/32 |
| 4,924,331 | 5/1990 | Robinson et al. | 360/72.1 |
| 4,947,367 | 8/1990 | Chang et al. | 395/500 |
| 5,072,378 | 12/1991 | Manka | 395/575 |
| 5,119,291 | 6/1992 | Flannagan et al. | 395/275 |
| 5,193,184 | 3/1993 | Belsan et al. | 395/600 |

OTHER PUBLICATIONS

N. K. Ouchi, "System for Blocking Variable–Length Records", IBM Tech. Disclosure Bull., Sep. 1973, pp. 1239–1240.
Hewlett–Packard, "Optical Disk Library System Technical Reference Manual," Dec. 1990.
IBM, "IBM System /360 and System/370 1/0 Interface Channel to Control Unit Orig. Equip. Manuf. Info.," Feb. 1988.
IBM, "IBM System/360 and System/370 Direct Control and External Interruption Features Original Equipment Manuf. Info.", Jul. 1971.
IBM, "Storage Subsystem Library: IBM 3990 Storage Control Reference," Dec. 1989.

Primary Examiner—Eric Coleman
Assistant Examiner—John Harrity
Attorney, Agent, or Firm—Baker, Maxham, Jester & Meador

[57] ABSTRACT

A computer installation is programmed for storing data in a magnetic disk DASD (direct access storage device) in the form of a track number identified by DASD cylinder number (CC) and DASD head number (HH). A re-writable, multi-disk optical storage which stores information in a fixed-block architecture including a sequence of sectors having the form of spirals on optical disk surfaces is enabled to emulate magnetic DASD by calculation-based conversion of storage references to magnetic DASD tracks to fixed-block optical sectors.

8 Claims, 4 Drawing Sheets

SYSTEM AND METHOD FOR MAPPING DIRECTLY ACCESSIBLE MAGNETIC DASD STORAGE TO FIXED BLOCK OPTICAL STORAGE

This application is a continuation of application Ser. No. 07/870,024, filed Apr. 17, 1992, now abandoned.

BACKGROUND

This invention is related to the storage of data in a computer system, and more particularly to the emulation of direct access magnetic disk storage by means of fixed block architecture optical storage. More particularly, the invention concerns the conversion of a direct access magnetic storage data recording format to a direct access optical storage recording format to permit fixed block optical storage to emulate magnetic storage.

As is known, large computer installations employ direct access storage device (DASD) subsystems for fast, efficient, and economical storage of data in a device which records and retrieves data in response only to a reference of the data's location. The principal device which supports direct access storage is a disk. The most widely used disk technology in present-day computer installations employs a rigid magnetic disk on which data is written magnetically in a location format based upon parallel tracks in the form of concentric rings on each surface of the disk. Typically, a hard disk drive will contain one or more disks and will provide for the independent, direct accessing of each surface of each disk. In a multi-disk DASD, each surface of each disk is accessed by a respective head/actuator assembly so that identification of particular head identifies a particular disk surface. Within a multi-disk DASD, the set of all tracks of the same nominal circumference form a "cylinder". Thus, each track of a multi-disk DASD can be uniquely identified by a cylinder number (CC) and a head number (HH). A two-dimensional track address CC HH permits a track to be directly accessed by moving an identified head (HH) to the circumferential location of an identified cylinder (CC).

Fixed block architecture (FBA) optical storage is receiving increasing attention as a complement to, or a substitute for, magnetic DASD. FBA optical storage possesses a greater storage capacity than magnetic DASD in bits per storage area (areal density) and provides access to stored data at a speed that is somewhat slower than that provided by magnetic DASD. As is known, the use of magneto-optical technology supports a re-writable FBA optical storage which includes all of the storage features enjoyed by magnetic DASD.

Computer installation considerations may make it desirable to utilize re-writable FBA optical storage in place of magnetic DASD. However, the I/O (input/output) configuration of virtually all modern computer installations is based upon the magnetic DASD track format. FBA optical storage typically has only a single sequence of optical sectors in the form of a spiral "track" on each surface of each optical disk, implying only a single dimension for optical storage location format. In particular, data on an optical disk surface is addressed by only giving the sector number of the data. Therefore, in order to fully accommodate data storage in fixed-block optical storage for a modern computer installation, there is a need for mapping magnetic DASD track identification to FBA optical sector identification.

Mapping of one address form to another is taught in the prior art in the form of look-up tables. For example, U.S. Pat. No. 3,082,406 shows conversion of an external address location form to an internal address form in a data storage system by use of a look-up table. U.S. Pat. No. 4,947,367 teaches storage of magnetic tape formatted data on a WORM (write once, read many times) disk. In this patent, a look-up table is generated for addressing each tape, and the table includes a present WORM disk volume number storing a portion of the tape data as well as a next WORM disk volume number storing another part of the tape data. As is known, look-up tables are expensive in terms of storage space. Thus, as the capacity of DASD storage increases, track address emulation based upon look-up table address conversion would increase overhead by multiplying the storage space required for look-up tables, and might slow storage access due to table retrieval. Thus, the most desirable solution of the problem stated above should avoid the use of look-up tables to convert magnetic DASD track addresses to FBA optical sector addresses.

SUMMARY OF THE INVENTION

The system and method of this invention, when connected to a computer installation, permit data referenced in magnetic DASD track format to be stored on a re-writable fixed block optical storage without alteration of the computer system's standard DASD access protocol. Preferably, the system and method of the invention operate in response to data storage references made by a computer installation through a structured I/O subsystem in which each channel of a plurality of channels connects one or more I/O devices to a central computer. In such a subsystem, a specific DASD track is accessed through a channel program comprising a plurality of channel command words (CCW's). A storage access channel program for locating, reading, or writing data in a magnetic DASD track includes command information identifying a DASD by control unit address (CUA) and a particular track by cylinder number (CC) and head number (HH).

The invention is based on the inventors' critical observation that, in an FBA optical storage device having a plurality of optical disks, all sectors of the optical disks can be assigned numbers in one sequence of numbers denoting the relative position of any sector to all other sectors. The number of an optical sector in this sequence is termed a relative optical sector (ROS) number. This sequence enables the use of equations to calculate optical sector addresses in response to CC and HH numbers and eliminates the need to use cumbersome look-up tables. These equations reside in a controller connected to a channelized I/O system. The controller converts a magnetic DASD CCHH track address into fixed block optical sector address for the beginning of a sequence of optical sectors forming an emulated magnetic DASD track.

In particular, the invention is practiced in an information processing system including a computing facility for processing data and channel means connected to the computing facility for directing the storage and retrieval of data in a plurality of direct access storage devices (DASD), data being stored in the form of a substantially circular track denoted by a cylinder number (CC) and a head number (HH) in a DASD denoted by a channel unit address (CUA). In this environment, the invention is a combination for storing such data in a fixed block optical storage format and the combination includes:

an optical storage apparatus, including a plurality of optical disks, for storing data on the optical disks in the form of a substantially spiralled sequence of addressable optical sectors on one or more of the optical disks;

a control facility connected to the optical storage apparatus for directing the reading or writing of data at an optical storage address in response to channel control information including track address data which identifies a circular track; and an address transform unit in the control facility for producing the optical storage address in response to CC, HH, and CUA data in the track address data, the optical storage address identifying a respective subsequence of optical sectors in the spiralled sequence having an information storage capacity at least equal to the information storage capacity of the circular track.

The invention thus enables a track of data in magnetic DASD format to be stored on, and retrieved from, fixed-block optical storage formatted into a sequence of sectors.

A principal objective of the invention, therefore, is to employ re-writable fixed block architecture optical storage to emulate magnetic storage.

A particular objective is to emulate the storage and retrieval of directly accessible storage tracks in fixed block optical sectors.

A significant advantage of the invention is provided in the translation of two-dimensional DASD track addresses into single-dimensional optical sector addresses without the use of look-up tables.

These and other objectives will be better understood from the following detailed description, taken together with the below-described drawings.

DETAILED DESCRIPTION OF THE PREFERRED EMBODIMENT

Figure 1:
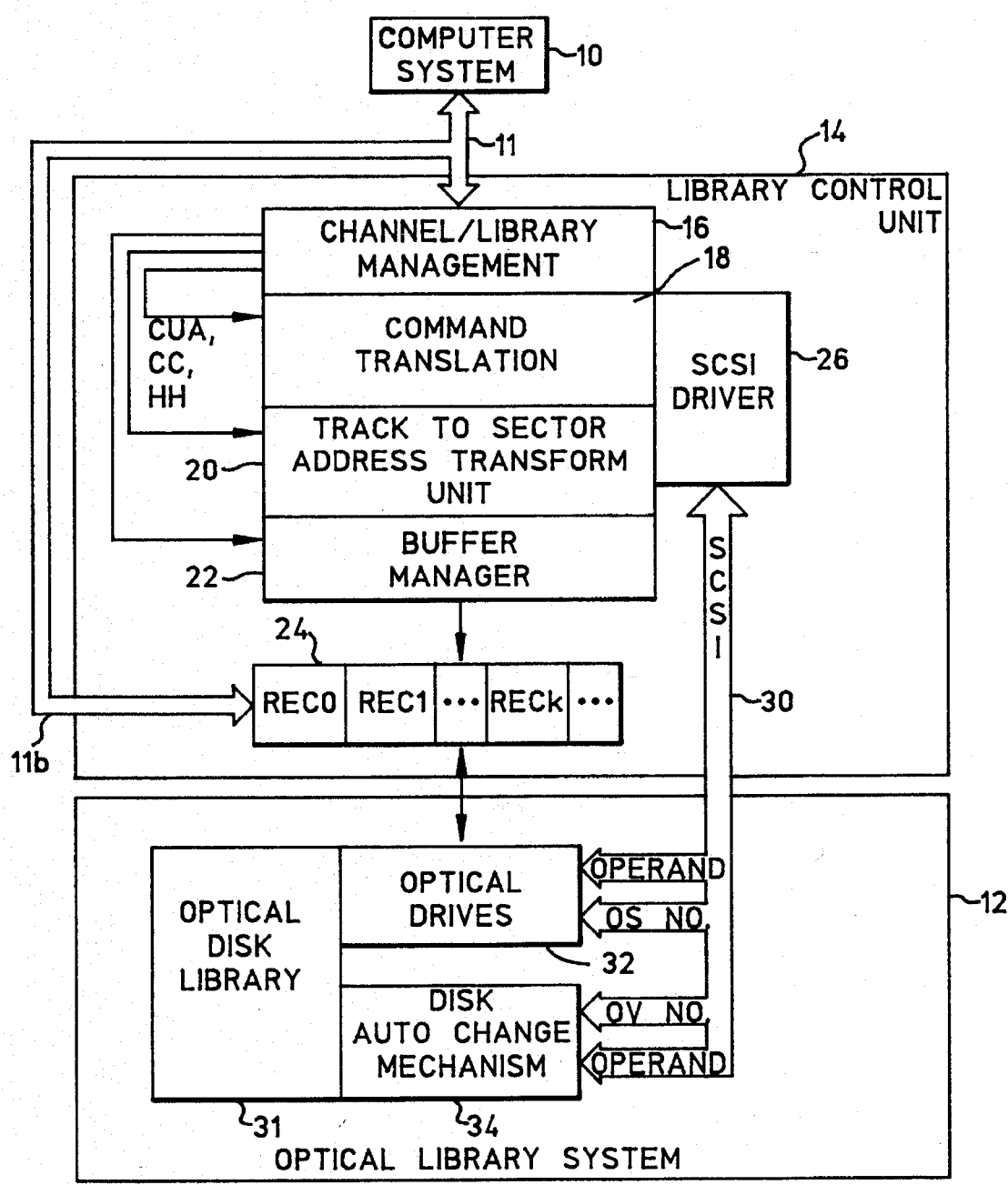
FIG. 1 is a block diagram of a computer installation which emulates magnetic DASD in an optical storage apparatus of the fixed block type according to the invention.
Figure 2:
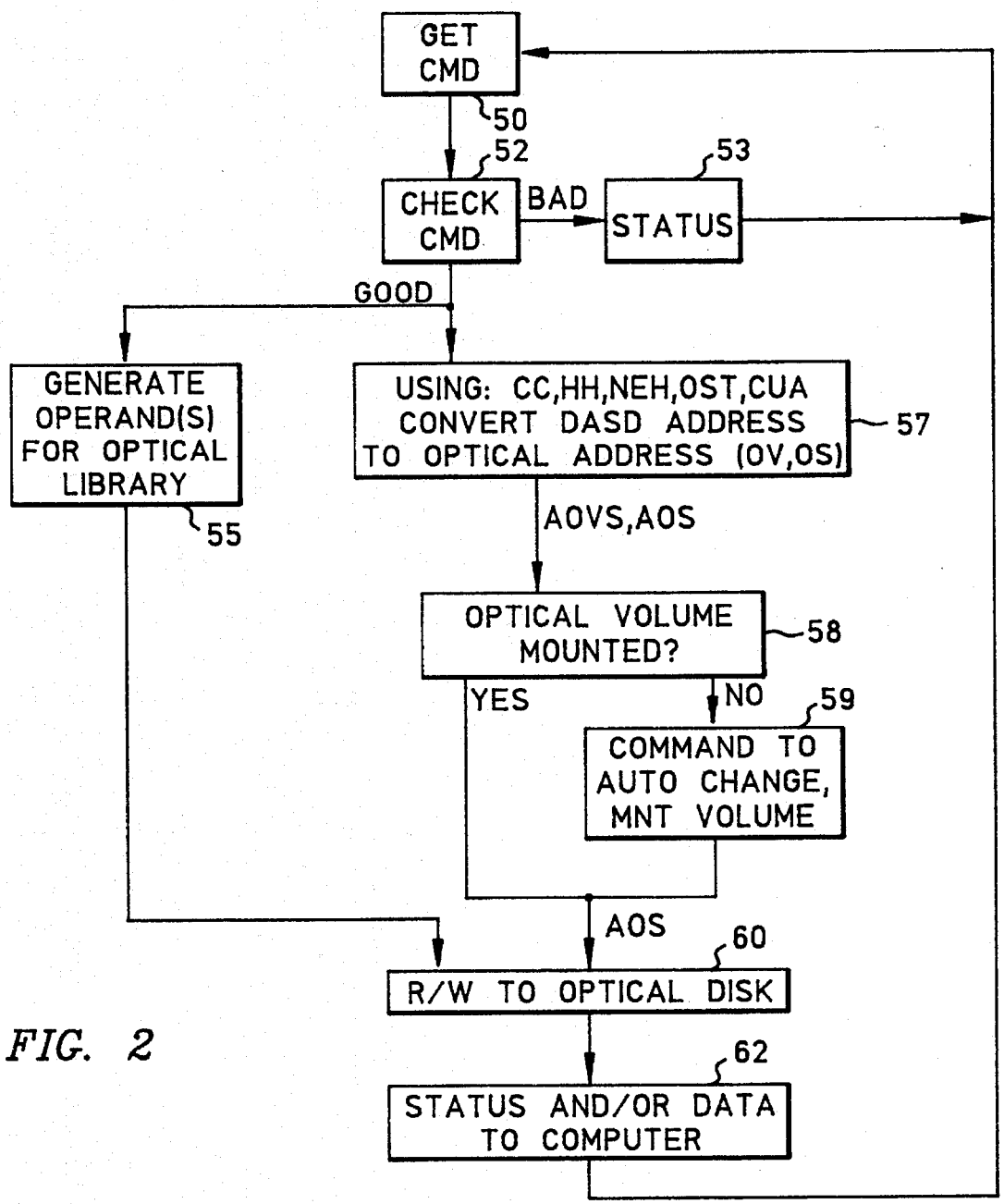
FIG. 2 is a flow diagram showing how the invention accesses a particular optical sector containing data in an emulated track referenced by the computer installation of FIG. 1.

In FIG. 1, a system block diagram is presented which illustrates the preferred embodiment of the invention, while FIG. 2 presents a flow chart illustrating the general operation of the embodiment. The system of FIG. 1 includes a computer system 10 programmed for storage and retrieval of data in an existing magnetic DASD format. The computer system 10 is connected for recording and retrieval of data in a magnetic DASD storage by a channelized I/O subsystem. The connection of the computer system 10 with a storage subsystem is symbolized by the I/O channel 11. In the invention, data is recorded in, and retrieved from, a storage subsystem which emulates a magnetic DASD. The storage subsystem includes a re-writable multi-disk optical storage apparatus 12 in the form of an optical library system which is connected to the channel 11 through a library control unit 14.

The storage subsystem receives a channel program on the channel 11 which is provided to a channel/library management component 16. The channel/library management component 16 executes the channel program by providing channel commands to a command translation unit 18, magnetic DASD track identification data (CC and HH) to an address transform unit 20 which transforms the magnetic DASD track address to an optical sector address, and buffer control information to a buffer manager 22. While performing its function, the management component 16 exhibits a standard magnetic DASD interface to the channel 11. Relatedly, a typical channel such as the channel 11 can comprise an channel interface which connects a mainframe processor with a magnetic DASD control unit. Such a channel interface is described, for example, in "IBM System/360 and System/370 I/O Interface Channel to Control Unit Original Equipment Manufacturer's Information", Document GA22-6974-09 (1984) and "IBM System/360 and System/370 Direct Control and External Interruption Features Original Equipment Manufacturer's Information", Document GA22-6845-3 (1971), both available from the IBM Corporation, Armonk, N.Y. The corresponding magnetic DASD control functions for channelized I/O architecture can be understood with reference to the volume entitled "IBM 3990 Storage Control Reference", Document GA32-0099-3 (1989), also available from the IBM Corporation. The IBM 3990 Storage Control Reference assumes magnetic DASD in the form of the well-known IBM 3380 and 3390 direct access storage devices.

Preferably, the optical library system employed in the emulation of magnetic DASD is a magneto-optical disk library system of the type described in the reference volume entitled "Optical Disk Library System Technical Reference Manual", Document 5959-3559 (1990), available from the Hewlett-Packard Company.

The commands for accessing, reading, and writing data in a magnetic DASD can be understood with reference to the IBM 3990 Storage Control Reference. These commands are provided over the channel 11 as a sequence of channel command words which form a channel program. The channel program is received by the management component 16. The commands included in the channel program are provided to the command translation apparatus 18 which translates them into the appropriate corresponding commands for the optical library system. Typical optical library system commands are found in the Optical Disk Library System Technical Reference Manual. Command translation is well understood in the art; in this invention it involves the recognition of a command sequence in a channel program and the mapping of the command sequence into an appropriate command sequence for the optical library system.

The channel/library management component 16 also derives from the channel program appropriate control information which is passed to the buffer manager 22 for the buffering of one or more tracks of data. In this regard, the buffer manager 22 controls a buffer 24 which may be provided, for example, in electronic read/write memory (not shown) included in the library control unit 14. The electronic memory buffer space is capable of storing at least one track of data. The typical configuration of a track is a sequence of records (REC0, REC1, ... RECk, ... ). Such configuration is well-known in the art and can be understood with reference to, for example, the count key data (CKD) and extended count key data (ECKD) architecture employed in magnetic DASD's of IBM 3380 and 3390 type. ECKD track architecture is a self-describing data format. In this regard, all records in ECKD-formatted track begin with a Count field of fixed length which describes the length of following Key and Data fields. A track containing ECKD records can be searched by adding the lengths of Count, Key, and Data Fields to find the start of the next record. The last record in the track is indicated by a bit in the count field of the last record. This architecture is employed by the buffer manager 22 in searching the memory image of a track buffered at 24.

A word concerning terminology. In the ECKD architecture, the data stored in a DASD is referred to as a "volume". Sometimes, the DASD itself is referred to as the volume; but, in this description, the first definition is preferred. The volume is indexed by addresses of the CCHHR type, where CC and HH have the same meanings given previously. The R portion of an address identifies a record and has the CKD form just discussed.

The important aspect of the library control unit 14 which concerns the invention is found in the sector address transform unit 20. The address transform unit 20 employs a calculation to translate the magnetic DASD track address to an optical sector address. The optical sector address includes an actual optical volume surface (AOVS) number and an optical sector (OS) number denoting the beginning of a sequence of optical sectors having an information storage capacity equal to that of a magnetic DASD track. In the preferred embodiment, an optical volume (OV) corresponds to a predetermined number of optical disks having the storage capacity to store a volume of data stored in DASD format. Each surface of each disk is identified by the OVS number. The optical address includes the OVS and OS numbers, which, together, identify the optical sector on a particular optical disk surface where storage of a magnetic DASD track begins.

Translated commands and optical disk address data are provided to a small computer system interface (SCSI) driver 26 which provides SCSI formatted commands to the optical library system 12.

As shown in FIG. 1, the optical library system library includes an optical disk library 31 containing a plurality of magneto-optical disks, a plurality of optical drive units 32, and a disk autochange mechanism 34. The optical disks in the library 31 can be moved by the disk autochange mechanism 34 between respective storage slots and respective ones of the optical drives 32. Both the optical drives 32 and the disk autochange mechanism operate in response to SCSI commands received on the SCSI interface 30. In particular, each optical drive responds to a SCSI command including an operand and an optical sector number. The optical drive denoted in the operand will access the optical disk engaged with it at the optical address denoted in the relevant SCSI command field. The disk autochange mechanism 34 will move a disk from a disk storage location to a specified optical drive in response to a SCSI command. The disk autochange SCSI commands interpret the OVS number by identifying the specific surface of a specific optical disk and moving that disk to engage the specific surface into engagement with an optical drive.

An emulated magnetic DASD track is either recorded or read by an optical drive utilizing the buffer 24. Alteration of a track buffered at 24 is directed by the buffer manager 22 at a respective record location in the buffered track. Since the invention buffers a magnetic DASD track 24, use of the invention in a library control unit such as the unit 14 to write a record requires the following command sequence: first, compute the optical storage address denoting the starting location (OVS and OS) of the emulated track in the corresponding optical volume and load the optical volume surface or surfaces containing the track data; next, read an image of the track into the buffer 24; then, write the record at the proper record location in the track image; and, write the updated track image from the buffer 24 back to optical storage beginning at the starting location. Reading a record requires computing the starting location of the emulated track, reading an image of the track containing the record to the buffer 24 and then accessing the record in the track image and providing it to the computer system 10.

FIG. 2 illustrates the operational sequence observed by the library control unit 14 in accessing the optical library system 12 in response to a reference by the computer system 10 to magnetic DASD storage. Initially, a command is obtained from a channel command word (CCW) at 50, and the command is checked for validity at 52. If invalid, status is posted at 53 and returned to the computer system 10. If the command is valid, the operand or operands necessary to effect the channel command is (are) generated at 55, while translation of the magnetic DASD track address to the optical address is performed at 57. Before the operand or operands are generated at 55, the optical volume surface (OVS) number is checked at 58 against currently-mounted optical disks. If the optical volume surface is not mounted, a command is issued at 59 to the autochange mechanism to mount the volume. At step 60, the operand or operands generated at 55 and the optical sector (OS) number generated at 58 are combined at step 60 to perform the required read or write operations on the identified optical volume surface, which is accessed by concurrently-engaged optical driver. Following the read or write operation, status information, data, or status information and data are returned to the computer system 10 at step 62 and the next channel command is awaited at 50.

Figure 3:
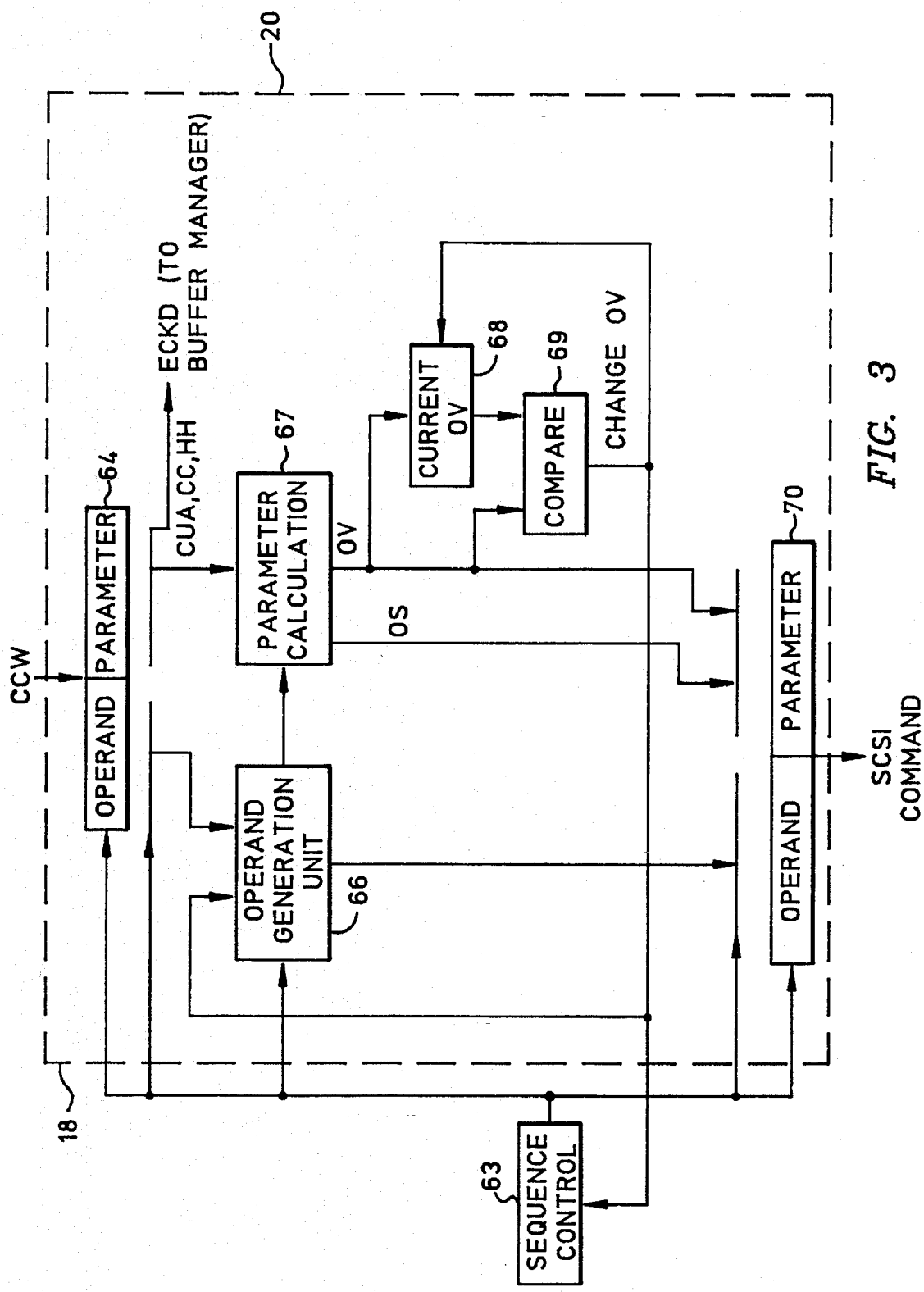
FIG. 3 is a schematic block diagram showing in greater detail elements of a controller included in FIG. 1.

FIG. 3 illustrates in greater detail specific elements of the command translation and parameter transform units 18 and 20 which are necessary to implement steps 57, 58, and 59 of the operational sequence of FIG. 2. The command translation unit 18 includes the operand field of a channel command register 64, an operand generation unit 66, and the operand field of a SCSI command register 70. The parameter transformation unit includes the parameter field of the channel command word register 64, an parameter calculation unit 67, a register 68 for holding a current optical volume surface number, a comparison unit 69, and the parameter field of the SCSI command register 70. A sequence control unit 63 generally controls the flow of data and synchronizes the operations of these elements.

Initially, a channel command is loaded into the register 64 and the operand field is provided to an operand generation unit which maps a channel command operand to one or more optical library command operands. The output of the operand generation unit 66 feeds the operand field of the SCSI command register 70. The parameter field of the channel command register 64 contains the control unit address for accessing a particular magnetic DASD, and the CC and HH numbers which identify a particular track in the addressed DASD. These numbers enable the parameter calculation unit 67 to calculate the optical sector and optical volume surface numbers necessary to map the addressed magnetic DASD track to optical storage. The current optical volume surface being accessed by the optical driver of interest is identified by the contents of the register 68 and compared against the calculated OVS number at 69. If the numbers are unequal, the compare unit 69 issues a Change OVS control signal which loads the calculated OVS number into the register 68 and prompts the operand generation unit 66 to generate one or more command operands for the autochange mechanism 34 which are necessary to load the calculated optical volume surface. The sequence control unit 63 ensures that the current channel command is retained in the register 64 until any necessary optical disk changes have been completed and ensures that the optical sector and optical volume numbers calculated by 67 are phased into the parameter fields of the register 70 in synchronism with the appropriate command operands. The SCSI commands are assembled and forwarded from the register 70 and include operands generated at 66 and OS or OVS numbers calculated at 67.

The parameter calculation unit 67 of FIG. 3 determines optical sector and optical volume surface numbers in response to values for CC, HH, and CUA according to the following equations:

$$f(ROS) = \{(DCN \times NEH) + DHN\} \times OST \qquad (1)$$

where:
ROS=Relative Optical Sector Number of an emulated magnetic volume
DCN=DASD Cylinder Number (CC)
NEH=Number of Emulated Heads (constant)
DHN=DASD Head Number (HH)
OST=Number of Optical Sectors per Emulated Track
OST=ETL÷OSL (Rounded up to next whole number)
ETL=Emulated Track Length in Bytes (constant)
OSL=Optical Sector Length in Bytes (constant)

$$f(AOS) = \text{remainder}(ROS \div OSV) \qquad (2)$$

where:
AOS=Actual Optical Sector Number within the Actual Optical Volume Surface
OSV=Number of Optical Sectors per Optical Volume Surface
ROS=Relative Optical Sector Number of the emulated magnetic volume $$f(AOVS) = \text{integer}(ROS \div OSV) + (CUA \times VPU) \qquad (3)$$

where:
AOVS=Actual Optical Volume Surface
OSV=Number of Optical Sectors per Optical Volume Surface
ROS=Relative Optical Sector Number of the emulated magnetic volume
CUA=Control Unit Address (Host device sub-channel address)
VPU=Number of Optical Volume Surfaces per emulated magnetic Volume These equations assume that the volumes to be stored are of equal size in byte storage capacity, as are the tracks in the volumes. In equation (1), a relative optical sector number is calculated which establishes a sequence of a predetermined number of optical sectors and which indicates where, within that sequence, the beginning of any emulated magnetic DASD track occurs with respect to any other magnetic track. For example, consider the IBM 3390 magnetic DASD, Model 2. This device has heads numbered 0–14, 2226 cylinders, numbered 0–2225, and 56,664 bytes per track. Assuming an optical sector length of 1024 bytes (which is equal to the sector length for the optical disk library system referenced above), the number of optical sectors per track (OST) is 56. Consider now the relative optical sector numbers for the following emulated tracks: CC=0, HH=0; CC=0, HH=1; CC=0, HH=14; CC=1, HH=0; and CC=2225, HH=14.

As Table I shows, all emulated tracks in the first cylinder, CC=0, are mapped into the first 840 relative optical sectors (0–839) and the first emulated track of the second cylinder (CC=1) begins immediately thereafter at relative optical sector 840. The last emulated track in the last cylinder (CC=2225, HH=14) begins at relative optical sector number 1,869,784 and ends, 56 optical sectors later at relative optical sector number 1,869,840. The implication is that a volume stored in a Model 3390 magnetic DASD is emulated in the referenced optical library system by an optical sequence of 1,869,840 consecutive sectors.

The actual optical address which locates any respective track in the emulated volume stored in the IBM 3390 magnetic DASD is given by equations (2) and (3). The address consists of the actual optical sector number (AOS) on an actual optical volume surface number (AOVS). Relatedly, the calculations discussed above with respect to relative optical sector number showed that 1,869,840 optical sectors are needed to emulate a magnetic volume stored in the 3390 device. Since the optical disk library system referenced above provides a storage capacity of 312,480 sectors per optical disk surface, it can be appreciated that a total of six optical disk surfaces (three optical disks) is necessary to form an optical volume which will emulate the 3390 magnetic DASD-stored volume. Equation (3) associates a respective set of six consecutively-numbered optical volume surfaces with a respective magnetic DASD identified by a control unit address (CUA). In the channelized I/O architecture discussed above, control unit addressing supports the identification of up to 64 individual magnetic DASD volumes, which are numbered 0–63. Given that SV=312,480 and VPU=6, the actual optical sector and actual optical volume surface numbers given in Table I assume an emulated magnetic DASD volume whose volume CUA is 10. For this emulated magnetic volume, the first track of the first cylinder (CC=0, HH=0) begins at optical sector 0 on optical volume surface 60. The last emulated track (CC=2225, HH=14) begins at optical sector 307,384 on optical volume surface 65, the last in the set of six optical volume surfaces numbered 60–65 which support the emulation of the magnetic DASD at channel address 10.

TABLE I

| EMULATED TRACK | ROSN | AOS | AOVS |
| --- | --- | --- | --- |
| CUA = 10, CC=0, HH=0 | 0 | 0 | 60 |
| CUA = 10, CC=0, HH=1 | 56 | 56 | 60 |
| CUA = 10, CC=0, HH=14 | 784 | 784 | 60 |
| CUA = 10, CC=1, HH=0 | 840 | 840 | 60 |
| CUA = 10, cc=2225, HH=14 | 1,869,784 | 307,384 | 65 |

Figure 4:
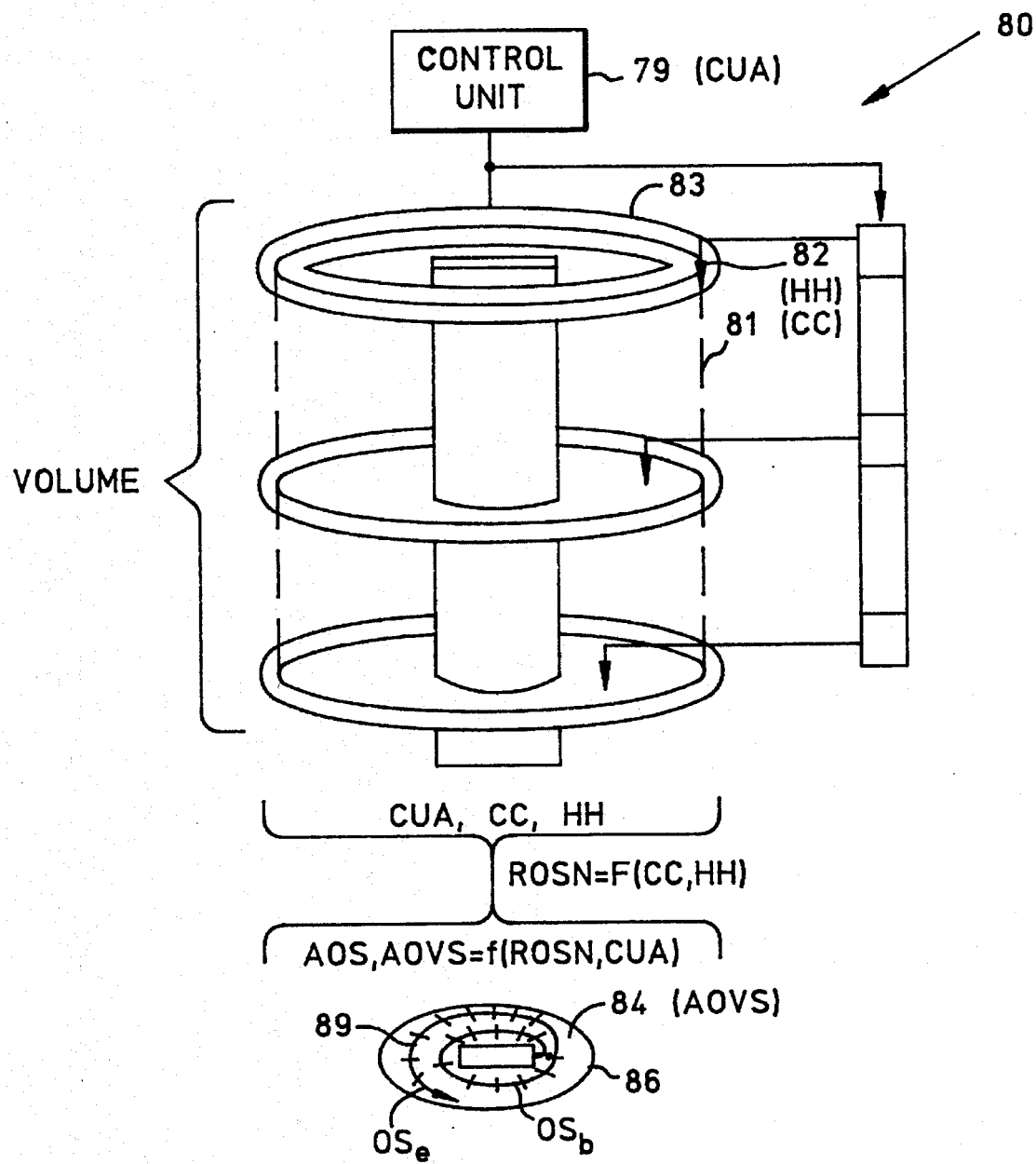
FIG. 4 is a partial schematic drawing illustrating the emulation of a magnetic DASD track by relative optical sectoring in disk-based optical storage of the fixed block type.

FIG. 4 illustrates how the invention supports emulation of magnetic DASD of the 3390 type with a re-writable fixed-block optical storage apparatus of the type described above. In FIG. 4, assume a control unit 79 having a control unit address CUA serves a 3390-type magnetic DASD indicated by reference numeral 80. In the magnetic DASD 80, a track positioned in a cylinder 81 (CC) and served by a magnetic head/actuator 82 (HH) is indicated by reference numeral 83 and identified by CCHH. Given CUA, CC, HH, the address calculation unit 67 of FIG. 3 derives the ROSN, and then the actual optical sector and optical volume values. These values are found on a respective surface 84 of an optical disk 86 which contains a spiral track 89 of optical sectors. It should be noted that the actual optical sector value (OS) calculated by the address calculation unit 67 is the number of the optical sector where the emulated track 83 begins; of course, the ending optical sector is calculated simply by adding to the beginning optical sector value the number OST, which is the number of optical sectors per track. Thus, the SCSI command built according to FIG. 3 for reading the emulated track 83 can be given two values by the address calculation unit 67: the beginning and ending optical sectors for the emulated track. These sectors are indicated by the values $OS_b$ for the beginning optical sector and $OS_e$ for the ending optical sector.

According to the description given above, it is possible now to emulate magnetic DASD in fixed-block optical storage by mapping magnetic DASD track addresses to optical sector addresses without modification to either the channel architecture for the magnetic DASD or the fixed block architecture of the optical storage apparatus. The address translation provided by the invention in combination with re-writable optical storage underpins a highly useful emulation of erasable magnetic DASD.

Although the invention has been described in terms of a specific embodiment, the inventors contemplate that modifications and substitutions to various components of the invention would occur to the person of ordinary skill in the art and, therefore, would be within the scope of the invention, which is to be limited only by the claims which follow.

We claim:

1. In an information processing system including a computer installation for processing data and channel means connected to the computer installation for directing storage and retrieval of data in a plurality of magnetic direct access storage devices (DASD's), each magnetic DASD including a plurality of rigid magnetic disks, data being stored in the form of a substantially circular track denoted by a cylinder number (CC) and a head number (HH) in a DASD identified by a channel unit address (CUA), a combination for storing said data in an optical storage format, the combination comprising:

optical storage means, including a plurality of optical disks, for storing data on said optical disks in sequences of respective optical sectors on one or more of the optical disks;

control means connected to the optical storage means for directing reading and writing of data at an optical storage address in the optical storage means in response to channel control information including track address data which identifies a circular track having an information storage capacity;

address means in the control means for producing the optical storage address in response to CC, HH, and CUA data in said track address data, the optical storage address identifying a respective subsequence of optical sectors having an information storage capacity at least equal to the information storage capacity of the circular track;

the optical storage address including an optical sector address in a sequence of optical sector addresses, the address means including relative optical sector means for converting the CC and HH data to a relative optical sector number (ROSN)denoting the position of the optical storage address in the sequence of numbers;

the relative optical sector means calculating the ROSN according to:

ROSN=((DCN×NEH+DHN)×OST where:

DCN=CC

NEH=total number of heads in a magnetic DASD

DHN=HH

OST=number of optical sectors per circular track, and

OST=(ETL÷OSL) rounded up to next whole number such that:

ETL=circular track length in bytes

OSL=optical sector length in bytes.

2. The combination of claim 1, wherein the optical storage address includes an optical volume surface number (OVS), the optical volume surface number identifying a particular surface of a particular optical disk on which is located a particular beginning sector of the respective subsequence of optical sectors, the address means including means for calculating the optical Volume surface number according to:

OVS=integer (ROS÷OSV)+(CUA×VPU)

where:

OVS=optical volume surface number

OSV=number of optical sectors per optical volume surface

ROS=relative optical sector number of claim 1

VPU=optical volume surfaces per CUA.

3. The combination of claim 2, wherein the optical storage address includes an optical sector number (OS), the optical sector number identifying a particular optical sector on the particular surface identified by OVS where the respective subsequence of optical sectors begins, the address means including means for calculating the optical sector number according to:

OS=remainder (ROS÷OSV).

4. An information handling system, comprising:

a computer for processing data, the computer including means for handling data in a directly-accessible format;

a storage apparatus including re-writable fixed-block optical media having a spiraled sequence of data storage sectors in which each sector is capable of storing a first predetermined number of data bytes;

a storage controller connected to the storage apparatus for directing reading and writing of data;

means connected to the computer and to the storage controller for requesting access to data using addresses in CCHH format, wherein CCHH is an address within a directly-accessible volume of data including a plurality of directly-accessible circular tracks of equal size;

relative optical sector (ROS) means in the storage controller for assigning to each directly accessible volume of data stored in the storage apparatus a relative optical media sector number (RSN) and assigning a second predetermined number of said sectors to each track of each volume stored in the storage apparatus;

address format conversion means in the storage controller responsive to requests for accessing data in a directly-accessible volume stored in the storage apparatus for:

identifying the RSN of the directly-accessible volume;

converting a CCHH address identifying the data and the RSN to a fixed-block address of a sector in the storage apparatus which stores an initial portion of a track containing said data; and accessing means in the controller for accessing storage media in the storage apparatus at an initial sector located at the fixed-block address and an additional number of sectors such that a total value representing a number of accessed sectors is equal to the second predetermined number;

each directly-accessible volume being stored in a third predetermined number of sectors on a plurality of disks; and the ROS means including means for calculating the RSN according to:

$$RSN = (CC \div N + HH) \times ST$$

where:

N is a predetermined number identifying a count of predetermined subdivisions of the directly-accessible volume and ST is the second predetermined number.

5. The information handling system of claim 4, wherein the fixed block address includes a disk surface number identifying a particular surface of a particular disk on which the initial sector is located, the address format conversion means including means for calculating the disk surface number (VS) according to:

$$VS = \text{integer } (RS \div SV) + (M \times VPU)$$

where:

VS = number of sectors per disk surface

M = a value in a CCHH address identifying the volume

VPU = the minimum number of disk surfaces having the capacity to store the volume.

6. The information handling system of claim 5, wherein the fixed block address includes a sector number identifying the initial sector on the particular surface, the address format conversion means including means for calculating the sector number (SN), according to:

$$SN = \text{remainder } (RS \div SV).$$

7. The information handling system of claim 4, wherein the storage controller further includes record access means for accessing a record stored in the second predetermined number of sectors.

8. The information handling system of claim 7, wherein each directly-accessible volume stored in the storage apparatus is stored in a third predetermined number of sectors.

* * * * *

UNITED STATES PATENT AND TRADEMARK OFFICE
CERTIFICATE OF CORRECTION

PATENT NO.   :   5,465,382
DATED        :   November 7, 1995
INVENTOR(S)  :   K. F. Day, III, et al.

It is certified that error appears in the above-indentified patent and that said Letters Patent is hereby corrected as shown below:

Column 7, Line 26, Delete "+", insert --$\frac{.}{.}$--.

Column 7, Line 30, Delete "+", insert --$\frac{o}{.}$--.

Column 7, Line 40, Delete "+" (first occurrence) insert --$\frac{.}{.}$--.

Column 8, Line 34, Delete "SV", insert --OSV--.

Column 10, Line 14, Delete "Volume", insert --volume--.

Signed and Sealed this

Fourteenth Day of May, 1996

Attest:

BRUCE LEHMAN

*Attesting Officer*         Commissioner of Patents and Trademarks